United States Patent [19]

Csepregi

[11] Patent Number: 5,277,141
[45] Date of Patent: Jan. 11, 1994

[54] ICE AND SNOW SURF-BOARD

[76] Inventor: Karoly Csepregi, 175 Elmwood Avenuen, Willowdale, Ontario M2N 3M3, Canada

[21] Appl. No.: 948,616

[22] Filed: Sep. 22, 1992

Related U.S. Application Data

[63] Continuation of Ser. No. 598,698, filed as PCT/CA90/00043, Feb. 13, 1990, abandoned.

[30] Foreign Application Priority Data

Feb. 21, 1989 [CA] Canada .................................. 591601

[51] Int. Cl.$^5$ .............................................. B62B 15/00
[52] U.S. Cl. ........................................ 114/43; 280/28; 280/28.11; 280/810
[58] Field of Search ................. 114/43, 39.2; 280/810, 280/28.11, 14.2, 21.1, 608

[56] References Cited

U.S. PATENT DOCUMENTS

| 88,457 | 3/1869 | de Bodisco | 280/28.11 |
|---|---|---|---|
| D. 194,270 | 12/1962 | Dunn | D34/15 |
| 1,903,930 | 4/1933 | Miller | 280/21.1 |
| 3,143,357 | 8/1964 | Krupnik | 280/16 |
| 3,352,567 | 9/1965 | Swanson | 280/12 |
| 3,436,087 | 10/1969 | Noland | 280/8 |
| 3,794,341 | 2/1974 | Torok | 280/21 R |
| 4,094,262 | 6/1978 | Riedel | 114/43 |
| 4,305,603 | 12/1981 | Müller | 280/14.2 |

FOREIGN PATENT DOCUMENTS

| 1148587 | 6/1983 | Canada | B62D 57/00 |
|---|---|---|---|
| 1204467 | 5/1986 | Canada | A63C 15/00 |
| 2711930 | 9/1978 | Fed. Rep. of Germany | 280/14.2 |
| 2720128 | 11/1978 | Fed. Rep. of Germany | 280/14.2 |
| 2801859 | 7/1979 | Fed. Rep. of Germany | A63C 5/00 |
| 2824997 | 12/1979 | Fed. Rep. of Germany | 280/810 |
| 3014665 | 11/1980 | Fed. Rep. of Germany | B62B 15/00 |
| 3048331 | 7/1982 | Fed. Rep. of Germany | 114/39.2 |
| 3036503 | 9/1982 | Fed. Rep. of Germany | 114/39.2 |
| 3303194 | 8/1983 | Fed. Rep. of Germany | 280/810 |
| 3309502 | 9/1984 | Fed. Rep. of Germany | B62B 15/00 |
| 3326451 | 1/1985 | Fed. Rep. of Germany | 280/28.11 |
| 3607808 | 9/1987 | Fed. Rep. of Germany | 280/14.2 |
| 3705568 | 9/1988 | Fed. Rep. of Germany | A63C 5/00 |
| 2547509 | 12/1984 | France | A63C 13/00 |
| 2581322 | 11/1986 | France | 280/14.2 |
| 8503916 | 9/1985 | World Int. Prop. O. | 280/14.2 |

*Primary Examiner*—F. J. Bartuska
*Assistant Examiner*—Thomas J. Brahan
*Attorney, Agent, or Firm*—Nixon & Vanderhye

[57] ABSTRACT

A sailboard for sailing on snow or ice with a conventional articulated hand held sail mounted on the sailboard. Two runners underneath the sailboard are located to provide balanced gliding and to permit the sailboard to be rolled laterally on the outermost portion of the runners. Each runner glides longitudinally and has low resistance to lateral slippage. However, the rear of each runner is shaped to resist lateral slippage. A blade is provided on the runner for sailing on ice. As the sailboard pitches fore and aft, the blade pivots to remain flat on the ice.

12 Claims, 4 Drawing Sheets

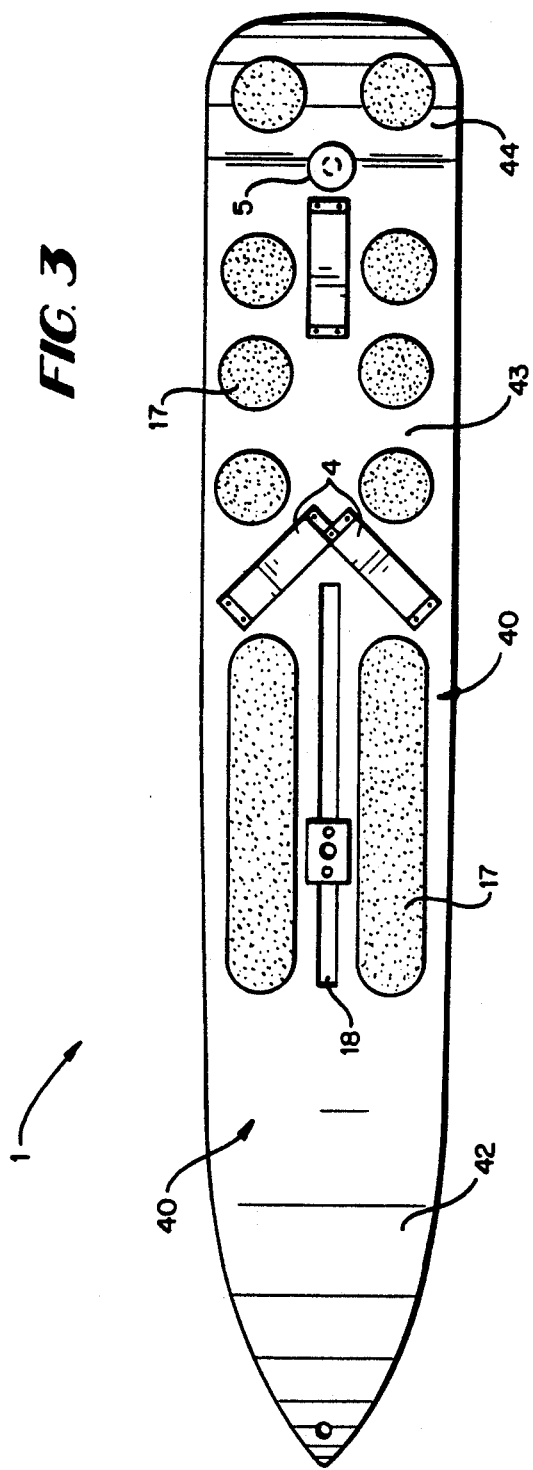
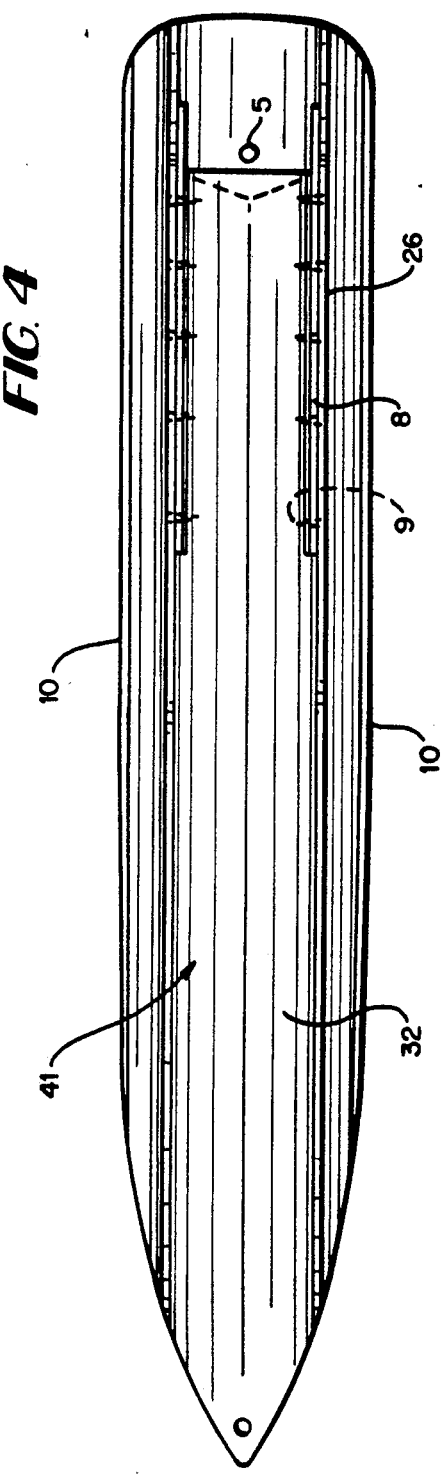

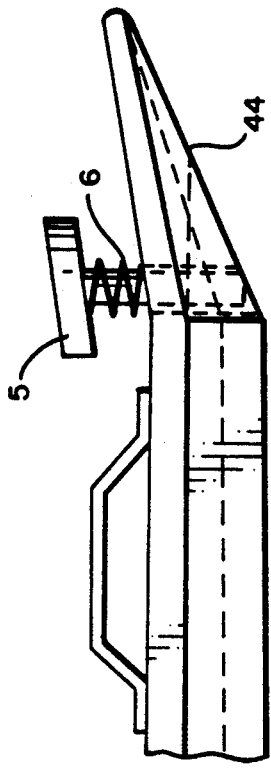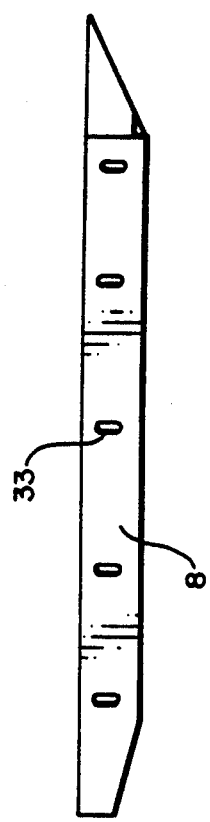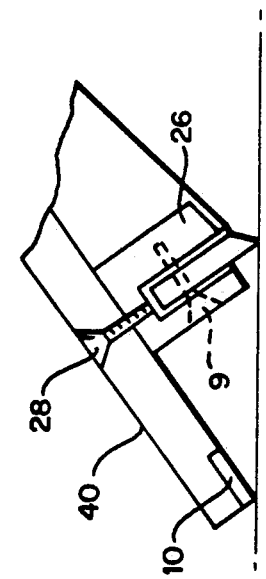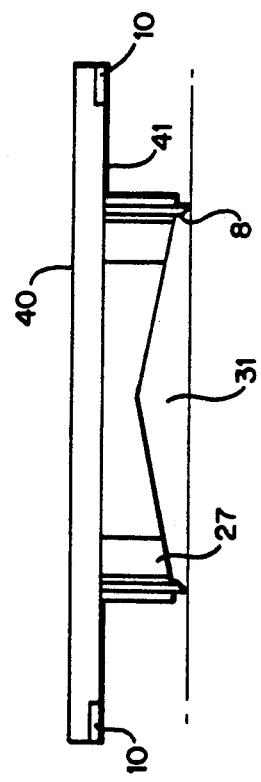

ICE AND SNOW SURF-BOARD

This is a continuation of application Ser. No. 07/598,698, filed as PCT/CA90/00043, Feb. 13, 1990, now abandoned.

FIELD OF ART

This invention relates to the field of art for ice boats and other sailing devices for use on snow or ice and to the art for the manufacture of sailboards for use with a conventional articulated hand held sail.

BACKGROUND OF PRIOR ART

It is well known in the prior art to construct ice boats and a variety of other devices to sail on ice and snow. It is also well known to manufacture devices for sailing on water which comprise a sailboard and a hand held sail mounted on the sailboard by means of an articulated mast. (The term "sailboard" is sometimes used in the prior art to mean only the hull of such a sailing craft and sometimes to indicate to whole craft including the sail. In this specification it is used to refer to the hull portion only.) The sail of such craft is usually equipped with a wishbone boom or functionally similar structure to enable a sailor to pull (or to push) the sail against the wind from either side of the sail. The articulated mast permits the sailor freely to rotate or pivot the sail as he wishes to control and direct the craft in the wind. Such sailboats are hereafter referred to as "free sail" sailboats.

It is also known to the inventor that attempts have been made in the prior art to construct free sail sailboats for sailing on snow or ice. The inventor is aware of C.P. 1,148,587 to Bruce Price,
C.P. 1,204,467 to Francois Lecomte
U.S. Pat. No. 3,794,341 to Torok
U.S. Pat. No. 3,352,567 to Swanson
U.S. Pat. No. 3,436,087 to Noland
U.S. Pat. No. 3,143,357 to Krupnik
U.S. Pat. No. 4,094,262 to Riedel, and
D. 194,270 to Dunn All such devices known to the inventor seem, however, to be constructed on the same principle, that is, a platform is provided upon which a sailor rides and either ski runners for snow or skate blades for ice are provided on struts to permit sliding over the terrain. In the inventor's opinion, having a platform separated from the runners by struts provides an inherently weak structure. It is particularly important to have a stable and strong structure should the runners strike a hole or crack in ice or other irregularities in the terrain surface. A depending blade or a ski might get caught, bend or break to cause the sailboard to upset. Since a sailing craft on ice or snow can achieve high speeds, such as 60-70 miles per hour, there could be serious consequences if there was a sudden loss of control and failure of the supporting structure in a high speed condition.

It has also been observed that many prior art sailing craft of this type have outstanding parts, such as a cross beam and front extension for the runners, which could catch on landscape features in passing and thereby create a dangerous situation during high speed sailing.

The present invention is designed to overcome these problems and may be constructed in a single piece to present a sailing device with no outstanding parts. The sailboard has a low design profile to be as close to the ground as possible. Therefore, it is perceived by the inventor to be safer than those known in the prior art. A large underside "surfing area" acts like a snowshoe in deep soft snow and will support a sailor on the surface of the snow and not get stuck like other prior art devices might. The sailboard is very manoeuvrable allowing the operator to turn sideways while rolling the sailboard over at an angle such as 45° while gliding or sailing on one runner only. In this position there is a lot more gripping against lateral slippage and greater potential for high speed. The board is built like a surfboard and has some water floating capabilities so that in emergengy situations it can go over weak ice or even some open water.

Further, the present invention provides a structure that permits good steering control during operation over a wide range of speeds without having moveable steering controls on the sailboard. Therefore, steering may be obtained by weight shifts and sail manipulation by a sailor operating the sailing craft in a manner similar to that conventionally used for sailing sailboards on water. Thus, skills acquired from one sport may be readily transferred to the other because of the nature of the construction of the present invention. Accordingly, the construction has the advantage of facilitating access to an existing parallel market.

THE INVENTION

The present invention is a sailboard for sailing on snow or ice with a conventional articulated hand held sail mounted on the sailboard characterized in that: the sailboard has a top side and an underside, a bow portion, a platform portion and a stern portion in which; at least the underside of bow portion extends forwardly and upwardly to permit the sailboard to ride up over surface irregularities. At least the underside of the stern portion extends rearwardly and upwardly to permit a sailor to press upon the top side of the sailboard over the stern portion to unweight the bow and platform portions. The underside has at least one longitudinal runner located sufficiently laterally inward from the most laterally outward part of the top side to provide balanced gliding and to permit the sailboard to be rolled laterally on the outermost of said runner(s) while maneuvering. Each said runner is shaped to glide longitudinally but with low resistance to lateral slippage except towards the rear of the platform portion of the sailboard where a part of each said runner, such as a blade, has a sharpened shaped to resist lateral slippage.

While the invention might be constructed with a single central runner or a plurality of such runners it is preferred that two runners be used. In all embodiments it will be appreciated by those skilled in the art that a balanced layout of runners should be obtained. Thus, if one runner is used it would be positioned centrally while a plurality of runners would be evenly distributed over the underside.

In the embodiment having two runners the underside has a channelled surface (sometimes referred to as channel means) extending along a central longitudinal axis between laterally upward and outward extending surfaces thereby forming two longitudinal runners in the underside. Each of the two runners is inwardly and downwardly displaced from the top side sufficiently to provide balanced gliding edges and to permit the sailboard to be rolled over laterally on either runner while maneuveuring.

In some embodiments of this invention particularly suited to icy conditions there are provided a front glide pad as part of the runner having low resistance to longitudinal or lateral slippage located integrally on each runner at the front of the platform portion and an integral projecting rear blade means which extends along as part of each said runner near the rear of platform portion of the sailboard. The length of the rear blade means (or other portion of the runner which resists lateral slippage) will be determined by the physical characteristics of the sailboard and the type of performance to be achieved.

The principle governing the construction of the runners is related to steering during gliding. There should be a sufficient length of the runner that resists lateral slippage towards the rear of the platform under the sailor to stabilize the craft for longitudinal sailing while moving across the wind on a tack. However, the length of the portion resisting lateral slippage will not be so long that it wil prevent the front of the sailboard from being turned by the sailor. The appropriate length of the lateral resistance portion of a runner or blade means will vary for different levels of performance or for different physical characteristics of an embodiment of this invention. The appropriate length may be determined empirically or otherwise by those skilled in the art from existing technology and this disclosure.

The runners on the underside are within the width of the top side of the sailboard. The underside is shaped laterally outward from the runners to permit the sailboard to be tilted or rolled over on its side to glide on one runner while unweighting or lifting another runner clear of the surface of the terrain. The underside may for example extend vertically upward then laterally outward from the runners to meet the edge of the top side. The displacement upward and outward from the runners to this top side edge will be of a sufficient distance to permit a sailor standing on the sailboard to roll or tilt the sailboard over on its side by shifting his or her weight, preferably while remaining in the footstraps on the board. This rolling action facilitates the steering at high speeds. The extent to which the top side projects laterally outward and upward over the runners will be determined by factors of stability, performance and the physical characteristics of the sailboard. This determination will be within the skill of persons skilled in the art.

The raised stern portion allows the sailor to unweight or lift the front of the craft to effect sharp turns. This action may be compared to the unweighting of a skateboard to achieve the same results. The determination of the dimensions of the stern projection will also be within the skill of persons skilled in the art.

The action, operation and look of the sailcraft of the present invention is similar to conventional free sail sailcraft used on water As in conventional sailboards, in the present invention the sail is mounted on a mast which is connected to the sailboard board to articulate about a joint. The boom for the sail surrounds the sail to be grasped from either side of the sail. The sail may be rotated about the joint connecting the mast to the sailboard to allow selection of the direction of incidence of the wind upon the sail. The present sailboard is fitted wth a mounting fixture adapted to receive most of the conventional universal joints commonly in use and which is adapted to be slid longitudinally along a portion of the board and fixed in position to permit adjustment for different performance as is conventionally done with free sail water craft.

The front and rear articulation of the mast of a free sail water craft allows steering by varying a turning moment created by the relative positions of the center of force of the wind on the sail and the center of force of the water resistance on the sailboard. When the mast is tilted forward, the board tends to turn out of the wind and when the mast is tilted backward, the board tends to turn into the wind. Similarly, on the sailboard of this invention the steering may be controlled in a similar manner, however, it is not fully understood how the center of force of the sailboard manifests itself. At high speed sailing on a short sailboard of a free sail water craft fore and aft tilting of the sail may become impractical because of the position of the sailor. Therefore, much of the steering is governed by weight shifts on the board seemingly with less sail manipulation. Similarly on the present invention at high speeds the steering is largely controlled by weights shifts by the sailor on the sailboard. The particular method employed by a sailor will be determined by his or her developed skills and the particular conditions at the time.

There are no steering controls connected to the board. It turns in response to the action of the operator. Also, on high speeds, the board may be rolled over sideways to get more speed and control. Less contact but more grip permits create higher speed. In lean position, the gap can be closed so well, allowing the minimum wind to escape. In 45°, the upper side of the board touches the bottom side of the sail. The board itself, because of the angle, catches the wind and guides it into the sail. Therefore, it creates more thrust than in a flat position. When the gap is open and the wind escapes, there is less power and less speed. The nose of the board is designed in such a way that it allows and guides it through any kinds of bumps or deep snow. Between the nose runners and the back runners, the board is flexible like skies. So when going over bumps, it will not lift as much and the back end under the operator's weight stays level with the surfaces. So gripping is continuous. The runners of the nose and the runners of the back are on the same level of the surfaces. They are slightly lower than the main body, so when they are running on the ice, the bottom part of the board is not touching it. Therefore, they will not wear out. When you hit the snow, the bottom will take it over and the runners act like a gripper. The front runners are flat or rounded so they can easily slide in any direction. the back runners are very sharp and heat hardened steels giving excellent grip.

One of the major features of this invention is the narrow bottom and the wider upper deck which make it possible to turn other board sideways. In this position the running blades has a lot of grip on ice or snow. A lot more thrust or pressure could be made without glide the board sideways. Having the maximum forward thrust gives it extremely high speed. The back end of the board is designed such upward angle so when the operator steps on it and forces his/her weight on it, the nose will lift up in the air, and the board can be turned around or used like one of the breaking methods.

It is not possible to foresee all the possible maneuvers that a sailor may execute while using this sailboard, for, as has been demonstrated by the use of skateboards and free sail water craft, the extent of what can be done seems to be limited only by the imagination of the sailors. The construction of the present invention, however, provides a solid, integral vehicle for the exercise of that imagination on snow and ice.

The sailboard of this invention is capable of reaching high speeds on ice and is capable of jumps and other high performance stunts that present a risk of injury to the sailor. Accordingly, the inventor warns that sailors should wear suitable protective clothing and helmets whenever operating this sailboard at high speeds.

In preferred embodiments of this invention a brake means is provided in the stern. The brake is a rod which fits in slideable connection through a hole in the stern and is biased upwardly by a spring. The top of the rod ends in a pedal which may be depressed by the sailor to push the rod onto the terrain surface to create drag t slow or stop the sailboard.

FIGURES

In the Figures that illustrate a preferred embodiment of this invention;

FIG. 3 is plan view of the upper body or top side of a sailboard in accordance with this invention.

FIG. 4 is bottom view of the underside of a sailboard in accordance with this invention.

FIG. 5 shows a vertical cross sectional view taken through the rear blade means of a sailboard in accordance with this invention.

FIG. 6 is a detail of the rear blade means that illustrates an adjustment means for the rear blade means and illustrates the manner in which the sailboard may rolled during operation.

FIG. 7 illustrates a blade means of this invention.

FIG. 8 is a side view of the stern and the braking means.

FIG. 9 is a detail of the rear blade means of an alternative embodiment of the sailboard and shows the sailboard being rolled during operation.

PREFERRED EMBODIMENT

Figure 1:
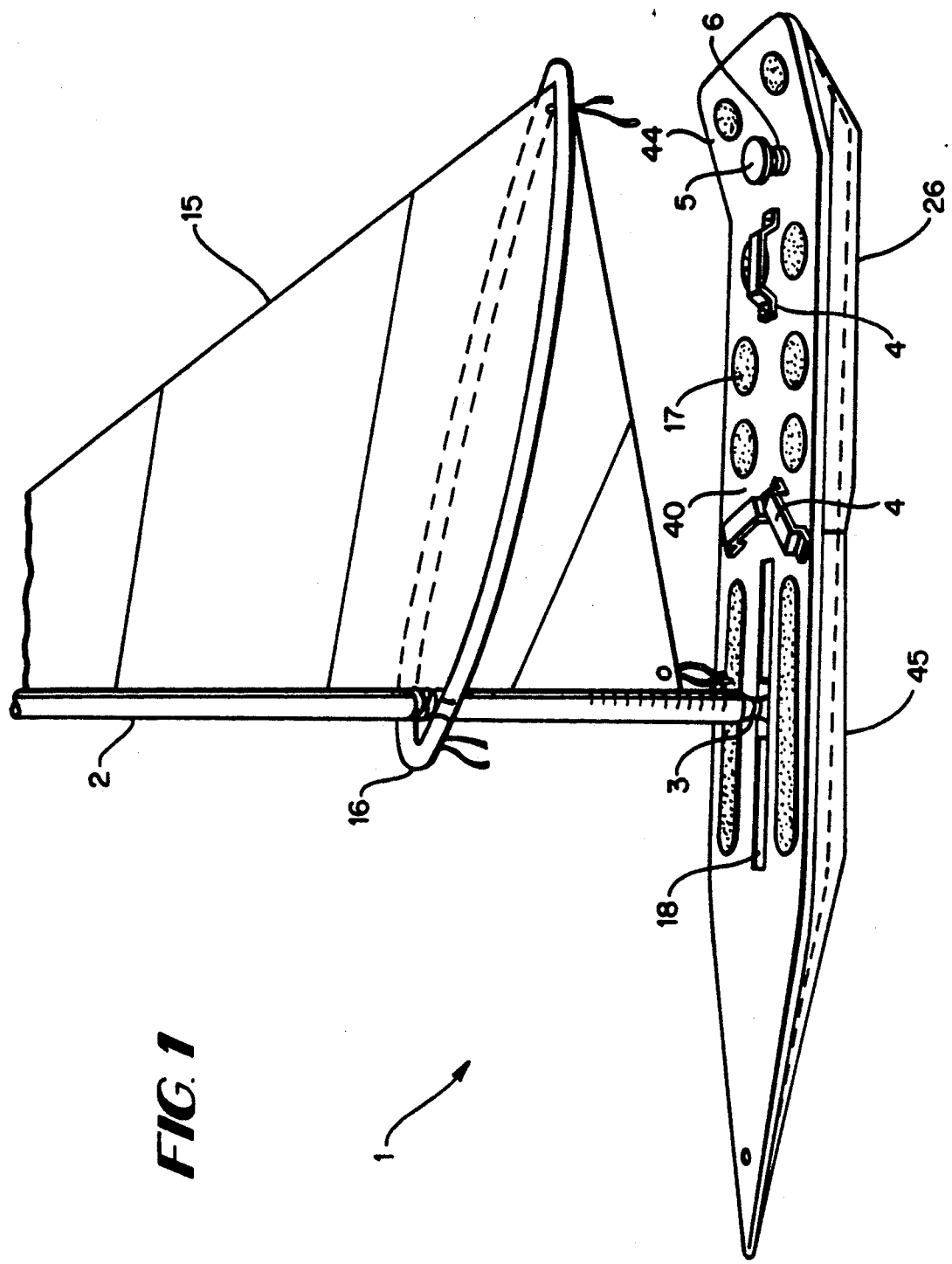
FIG. 1 is a perspective view of a sailing device in accordance with this invention.

In the figures that illustrate a preferred embodiment of this invention;

(1)—generally indicates a sailboard of this invention,
(2)—indicates an articulated mast of a conventional free sail rigging,
(3)—indicates a conventional universal joint,
(4)—indicates conventional foot straps for a sailboard,
(5)—indicates a brake,
(6)—indicates a brake spring,
(8)—indicates the rear runner blade means,
(9)—indicates the side mounting screws for the runner blades,
(10)—indicates a side edge means along the laterally outermost part of the underside of the sailboard,
(11)—indicates the apogee of the channel means,
(12)—indicates the glide pads of the runners,
(13)—indicates the underside of the bow portion of the sailboard,
(15)—indicates a conventional sail of a free sail rigging,
(16)—indicates a conventional wishbone boom of a free sail rigging,
(17)—indicates rubber slip resistant pads,
(18)—indicates a conventional track in the top side for adjustment of the free sail rigging,
(26)—indicates a runner blade box,
(27)—indicates runner blade reinforcing supports,
(28)—indicates a runner blade adjustment screw,
(31)—indicates the channel in the underside,
(32)—indicates the surface of the underside,
(33)—indicates runner blade mounting slots.
(40)—indicates the top side
(41)—indicates the underside
(42)—indicates the bow portion
(43)—indicates the platform portion
(44)—indicates the stern portion
(45)—indicates a runner In FIG. 1 the sailboard (1) of this invention is shown fitted with a conventional free sail rigging including a sail (15), a wishbone boom (16) and an articulated mast (2) mounted on the sailboard by a conventional universal joint (3). The joint (3) is fitted into a conventional track (18) in the top side of the sailboard to allow adjustment of the positon of the free sail rigging in the manner known and used for free sail water craft. The top side (40) of the sailboard (1) has rubber slip resistant pads (17) on the deck of the sailboard. The sailboard (1) also has conventional foot straps (4) which help to avoid slipping and provide greater control of the sailboard (1) during high speed operation.

A brake (5) biased upwardly by a brake spring (6) [shown in more detail in FIG. 8] is provided in the stern portion (44) of the sailboard. To operate the brake (5) a sailor would step on it to press it through the upturned underside of stern portion (44) down upon the surface of the terrain to frictionally resist movement. The brake may also serve as a pivot point for more dramatic stop and pivot manueveurs.

The runner blades (8) are part of the rear portion of the runners under the rear part of platform portion (43) of the sailboard where the sailor's weight would be most concentrated. The runner blades form a sharp apex to the runners under the rear of the platform. The blades (8) are mounted in the runners (45) with side mounting screws (9) which pierce a runner blade box (26) in the runners (45). The blades (8) have mounting slots (33) which receive the side mounting screws (9). The projection of the blades (8) outside the box (26) is adjustably set with blade adjustment screws (28) in the top side (40) which project through the runners (45) to the top of the blade (8). Adjustment of the height of a blade (8) will be obtained by turning the screws (28) to push the blade (8) lower. Other means to obtain the adjustment of the blade (8) will be obvious to one skilled in the art. It is preferred that either the box (26) or the blades (8) be mounted to permit a small degree of fore and aft pitch so that if the front of the sailboard is raised by an irregularity in the surface the blades at the rear remain flat on the surface to prevent side slipping. It will be obvious to persons skilled in the art that there are many ways of achieving this pitching mobility in the blades and that the degree of mobility will be determined by performance considerations and the physical characteristics of a sailboard. Screws (28) may serve as a pivot point for example. One factor of significance to this determination will be the degree of flexibility to bending along the length of the board.

A side edge means (10) is preferrably provided along the laterally outermost edge of the underside where it meets the top side of the sailboard to take the wear occasioned by the action of rolling the sailboard on its side during sailing. In one preferred embodiment the edge (10) is a sharpened metal ridge similar to the edge of a downhill ski. In this embodiment the edge may be ridden as a runner in sharp turns.

It is foreseen that some kind of blade reinforcing supports (27) may be required to secure the blade boxes (26) to the underside of the sailboard (1) against the forces created during turning. The inventor has provided such supports inward of the blade box (26) since the greatest force is usually that directed inward while riding on one blade while turning or tacking. It will be obvious to one skilled in the manufacture of such devices that there would be a number of ways to adequately support the blades in the runners.

Figure 2:
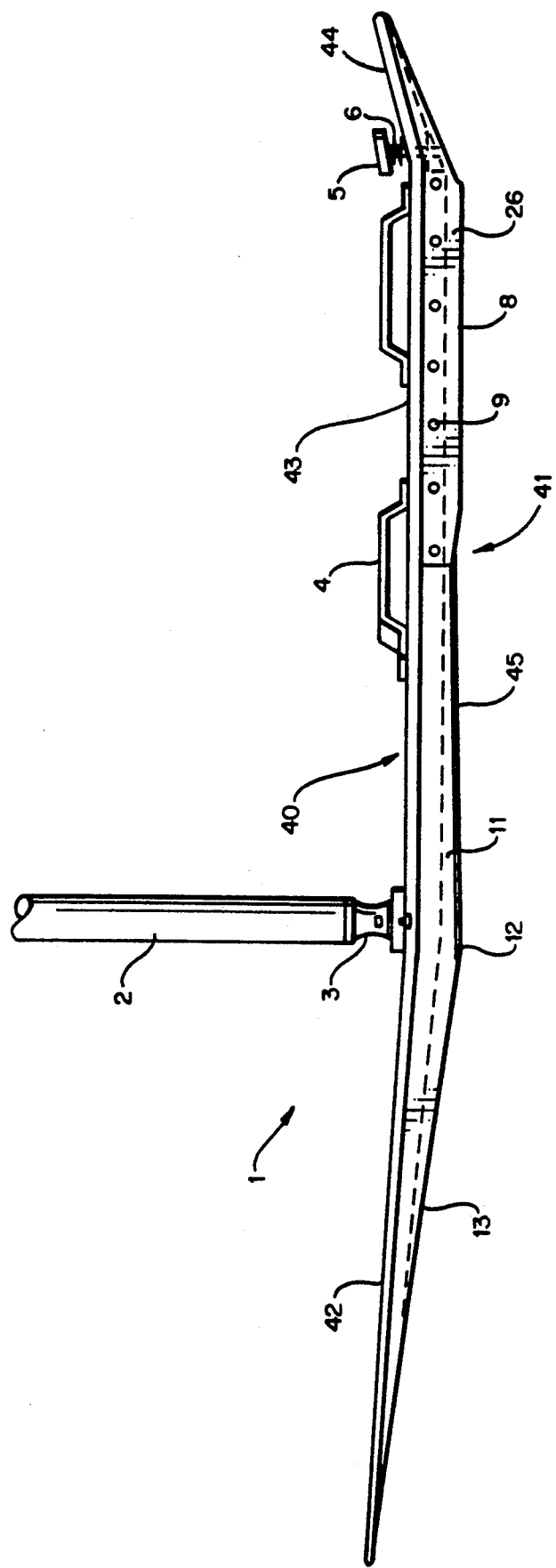
FIG. 2 is a side view of a sailing device in accordance with this invention.

The sailboard (1) has a channel (31) along the longitudinal center of the surface of the underside (41) which extends from the bow to the stern, although not necessarily from very front to the very back. The lateral ridges of channel (31) become the longitudinal runners (45) in surface of the underside (31). In FIG. 2 the apogee (11) of the channel (31) is shown as a dotted line.

It will be appreciated that the particular shape of the channel will be a matter of design for performance. No doubt many designs may be conceived of that employ concave or inverted "V" shapes or other shapes that will have particular performance characteristics for particular conditions. It is possible that a plurality of channels forming a plurality of runners may be employed. It is possible that only one runner centrally located could be used without a channel. It will be appreciated that the underside should have a slippery surface. Plastic, fibreglass, epoxy and even metal surfaces may be appropriate. The selection of materials is a matter within the skill of the art.

The shape of the runners should be such that there is little resistance to lateral slippage near the front of the sailboard while there is greater resistance at the rear. This facilitates turning. There should also be a sufficient length of the runner that resists lateral slippage so that the sailboard can tack.

The shape of the runners is dictated by the slope of the inner walls of the channel (31) and by the slope of the underside extending laterally from the runners to the top side. Generally, in snow or snow covered ice the steeper the slopes of the runner side walls the greater the resistance to lateral slippage. Therefore the shape of channel (31) may vary accordingly from the bow to the stern. On bare ice, sharp edges of the runners such as provided by blades (8) are required to prevent lateral slipping. It is also preferred that glide pads (12) of hardened surfaces (preferrably metal) be affixed to and made part of the runners on the rear part of underside of the bow portion (13) of the sailboard. The glide pads (12) are adapted to receive the wear and tear of forward motion or lateral turning and to present little frictional resistance to either.

EXPLOITATION AND USE

The sailboard of this invention may be manufactured for sale to be used with conventional free sail rigs for sailing on ice and snow during the winter. There are many people who have the skill to operate free sail craft who are unable to practice their skill in the winter months because until now there has not been a sailboard that would permit them to do so. The present invention is surprising in its mobility and maneuveurability and provides at least as much excitement as the corresponding water sport. Therefore, it is seen that this invention may be exploited to create a new manufacture and a new sport.

What is claimed is:

1. A sailboard for sailing on snow or ice with an articulated hand-held sail mounted on the sailboard wherein the sailboard has a topside and an underside, a bow, a platform and a stern; the improvements comprising:

the portion of said underside underneath the bow extends forwardly and upwardly to permit the sailboard to ride up over surface irregularities, the portion of said underside underneath the stern extends rearwardly and upwardly to permit a sailor to press upon the topside of the stern to unweight the bow and platform while maneuvering the sailboard, said underside has two longitudinal runners separated by a channel extending at least partially the length of said runners, each of said runners located sufficiently laterally inward and downward from each most laterally outward part of the underside to permit the sailboard to be rolled on either of the said runners while maneuvering, said runners extending substantially the entire length of the underside underneath said platform, each most laterally outward part of the underside has a side edge to resist lateral slippage when the sailboard is rolled over onto said side edge, and each said runner being shaped to glide longitudinally and with low resistance to lateral slippage except that a part of each said runner underneath the platform has a sharp apex extending downward from said channel to resist lateral slippage.

2. A sailboard as in claim 1 wherein said channel extends along a central longitudinal axis of said sailboard between laterally downward and outward extending surfaces to form said two longitudinal runners integrally in said underside.

3. A sailboard as in claim 2 wherein said runners at the front of the platform do not protrude downwardly from said channel, and further comprising a rear blade forming said sharp apex of said runner near the rear of the platform to resist lateral slippage during tacking of the sailboard.

4. A sailboard as in claim 1 or 3 wherein said stern further comprises an upwardly-biased brake mounted for movement downward under foot pressure to frictionally engage a terrain surface over which the sailboard is gliding.

5. A sailboard as in claim 1, 2 or 3 wherein each runner is inwardly and downwardly displaced sufficiently from the side edge to permit the sailboard to be rolled over laterally to an angle of 45 degrees on either runner without riding on said side edge.

6. A sailboard as in claim 3 wherein the runner blades are mounted pivotally within each runner to pitch fore or aft to improve contact with underlying terrain surface when the bow is displaced vertically by a surface irregularity.

7. A sailboard as in claim 3 wherein the runner blades are mouthed pivotally within each runner to pitch fore or aft to improve contact with the underlying terrain surface when the bow is displaced vertically by a surface irregularity, and the runner blades are mounted adjustably within the runners to permit upward or downward adjustment of the blades.

8. A sailboard for sailing on snow or ice with an articulated hand-held sail mounted on the sailboard, said sailboard comprising:

a bow, platform and stern;

a plurality of longitudinal runners underneath said platform and at least a portion of said bow, said runners located sufficiently laterally inward and downward from the outer edges of said platform to permit the sailboard to be rolled on either of the said runners while maneuvering, said runners extending substantially the entire length of said platform, a channel between said runners underneath said platform and said bow, channel surfaces extending outwardly and downwardly from the longitudinal axis of said sailboard to said runners, said channel surfaces being substantially flush with said runners underneath the front portion of said platform and said bow, and said runners having a sharp apex extending downwardly from said channel surfaces underneath the rear portion of said platform.

9. A sailboard as in claim 8 wherein said runners extending downwardly from said channel surfaces comprise blades.

10. A sailboard as in claim 9 wherein said blades are pivotably mounted within said runners.

11. A sailboard as in claim 8 further comprising underside edges underneath said platform and upstanding and outward from said runners, said underside edges being elevated from the surface of snow and ice by said runners such that said edges do not engage the snow and ice surface while said sailboard is tilted at shallow angles.

12. A sailboard as in claim 11 wherein said shallow angles are less than 45 degrees.

* * * * *